(12) United States Patent
Jaisinghani

(10) Patent No.: US 10,931,599 B2
(45) Date of Patent: Feb. 23, 2021

(54) AUTOMATED FAILURE RECOVERY OF SUBSYSTEMS IN A MANAGEMENT SYSTEM

(71) Applicant: PayPal, Inc., San Jose, CA (US)

(72) Inventor: Devendra Rajkumar Jaisinghani, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 97 days.

(21) Appl. No.: 16/190,048

(22) Filed: Nov. 13, 2018

(65) Prior Publication Data

US 2019/0253367 A1 Aug. 15, 2019

Related U.S. Application Data

(63) Continuation of application No. 14/685,185, filed on Apr. 13, 2015, now Pat. No. 10,129,176, which is a
(Continued)

(51) Int. Cl.
*G06F 11/20* (2006.01)
*H04L 12/911* (2013.01)
(Continued)

(52) U.S. Cl.
CPC ............ *H04L 47/829* (2013.01); *G06F 3/048* (2013.01); *G06F 11/203* (2013.01);
(Continued)

(58) Field of Classification Search
CPC ... H04L 47/829; H04L 41/0803; H04L 67/30; H04L 41/145; H04L 41/12;
(Continued)

(56) References Cited

U.S. PATENT DOCUMENTS

| 5,049,388 A | 9/1991 | Knight et al. |
| 5,639,441 A | 6/1997 | Sievers et al. |

(Continued)

FOREIGN PATENT DOCUMENTS

WO 2011014830 A1 2/2011

OTHER PUBLICATIONS

Chinese Application Serial No. 201080044371.X, Office Action dated Jan. 8, 2014, With English Translation of Claims, 21 Pgs.
(Continued)

*Primary Examiner* — Yair Leibovich

(57) ABSTRACT

Systems and methods for automated failure recovery of subsystems of a management system are described. The subsystems are built and modeled as services, and their management, specifically their failure recovery, is done in a manner similar to that of services and resources managed by the management system. The management system consists of a microkernel, service managers, and management services. Each service, whether a managed service or a management service, is managed by a service manager. The service manager itself is a service and so is in turn managed by the microkernel. Both managed services and management services are monitored via in-band and out-of-band mechanisms, and the performance metrics and alerts are transported through an event system to the appropriate service manager. If a service fails, the service manager takes policy-based remedial steps including, for example, restarting the failed service.

20 Claims, 10 Drawing Sheets

Related U.S. Application Data continuation of application No. 12/831,929, filed on Jul. 7, 2010, now Pat. No. 9,009,521.

(60) Provisional application No. 61/230,584, filed on Jul. 31, 2009.

(51) Int. Cl.
  H04L 12/24 (2006.01)
  G06F 3/048 (2013.01)
  H04L 29/08 (2006.01)
  *G06F 9/4401* (2018.01)
  *H04L 12/14* (2006.01)
  *H04L 29/06* (2006.01)

(52) U.S. Cl.
  CPC .......... *H04L 41/0803* (2013.01); *H04L 41/12* (2013.01); *H04L 41/145* (2013.01); *H04L 67/30* (2013.01); *G06F 9/4401* (2013.01); *H04L 12/14* (2013.01); *H04L 12/1428* (2013.01); *H04L 65/80* (2013.01)

(58) Field of Classification Search
  CPC ..... H04L 12/1428; H04L 65/80; H04L 12/14; G06F 11/203; G06F 3/048; G06F 9/4401; G06F 15/00
  USPC ............................................................ 714/4
  See application file for complete search history.

(56) References Cited

U.S. PATENT DOCUMENTS

| | | | |
|---|---|---|---|
| 5,812,533 | A | 9/1998 | Cox et al. |
| 5,958,378 | A | 9/1999 | Waldrep et al. |
| 6,090,407 | A | 7/2000 | Knight et al. |
| 6,106,859 | A | 8/2000 | Densmore et al. |
| 6,148,335 | A | 11/2000 | Haggard et al. |
| 7,206,790 | B2 | 4/2007 | Kodama |
| 7,225,249 | B1 | 5/2007 | Barry et al. |
| 7,315,985 | B1 | 1/2008 | Gauvin et al. |
| 7,340,520 | B1 | 3/2008 | Jordan et al. |
| 8,045,486 | B2 | 10/2011 | Swan |
| 8,316,305 | B2 | 11/2012 | Jaisinghani |
| 9,009,521 | B2 | 4/2015 | Jaisinghani |
| 9,329,951 | B2 | 5/2016 | Jaisinghani |
| 9,442,810 | B2 | 9/2016 | Jaisinghani |
| 9,729,468 | B2 | 8/2017 | Jaisinghani |
| 10,129,176 | B2 | 11/2018 | Jaisinghani |
| 10,320,709 | B2 | 6/2019 | Jaisinghani |
| 10,374,978 | B2 | 8/2019 | Jaisinghani |
| 2002/0106330 | A1 | 8/2002 | Waldrep et al. |
| 2002/0116234 | A1 | 8/2002 | Nagasawa |
| 2003/0004744 | A1 | 1/2003 | Greene et al. |
| 2004/0054790 | A1 | 3/2004 | Himmel et al. |
| 2004/0054850 | A1 | 3/2004 | Fisk |
| 2004/0103173 | A1 | 5/2004 | Donatelli et al. |
| 2004/0199572 | A1 | 10/2004 | Hunt et al. |
| 2004/0225952 | A1 | 11/2004 | Brown et al. |
| 2005/0021742 | A1 | 1/2005 | Yemini et al. |
| 2005/0044301 | A1* | 2/2005 | Vasilevsky ............ G06F 9/5083 711/1 |
| 2005/0108727 | A1 | 5/2005 | Bernstein et al. |
| 2005/0120160 | A1* | 6/2005 | Plouffe ................. G06F 9/4856 711/1 |
| 2005/0198247 | A1 | 9/2005 | Perry et al. |
| 2005/0262194 | A1 | 11/2005 | Mamou et al. |
| 2006/0031930 | A1 | 2/2006 | Patrick et al. |
| 2006/0059253 | A1 | 3/2006 | Goodman et al. |
| 2006/0294238 | A1 | 12/2006 | Naik et al. |
| 2007/0067847 | A1 | 3/2007 | Wiemer et al. |
| 2007/0174036 | A1 | 7/2007 | Schmidt et al. |
| 2007/0233881 | A1 | 10/2007 | Nochta et al. |
| 2008/0016311 | A1 | 1/2008 | Harada |
| 2008/0037532 | A1 | 2/2008 | Sykes et al. |
| 2008/0123559 | A1 | 5/2008 | Haviv et al. |
| 2008/0162498 | A1 | 7/2008 | Omoigui |
| 2008/0288661 | A1 | 11/2008 | Galles |
| 2008/0289012 | A1 | 11/2008 | Shi et al. |
| 2008/0320482 | A1 | 12/2008 | Dawson et al. |
| 2009/0083717 | A1 | 3/2009 | Branson et al. |
| 2009/0171730 | A1 | 7/2009 | Bobak et al. |
| 2009/0276771 | A1 | 11/2009 | Nickolov et al. |
| 2009/0290513 | A1 | 11/2009 | Swan |
| 2010/0082133 | A1 | 4/2010 | Chouinard et al. |
| 2011/0029810 | A1 | 2/2011 | Jaisinghani |
| 2011/0029882 | A1 | 2/2011 | Jaisinghani |
| 2011/0029981 | A1 | 2/2011 | Jaisinghani |
| 2011/0126108 | A1 | 5/2011 | Beaudoin et al. |
| 2012/0102180 | A1 | 4/2012 | Jaisinghani |
| 2012/0179928 | A1 | 7/2012 | Haustein et al. |
| 2014/0372533 | A1 | 12/2014 | Fu et al. |
| 2015/0220408 | A1 | 8/2015 | Jaisinghani |
| 2016/0197851 | A1 | 7/2016 | Jaisinghani |
| 2018/0063028 | A1 | 3/2018 | Jaisinghani |

OTHER PUBLICATIONS

Chinese Application Serial No. 201080044371.X, Office Action dated May 13, 2015, With English Translation of Claims, 26 Pgs.
Chinese Application Serial No. 201080044371.X, Office Action dated Sep. 18, 2014, With English Translation of Claims, 31 Pgs.
Chinese Application Serial No. 201080044371.X, Response filed Feb. 3, 2015, With English Translation of Claims, 16 Pgs.
Chinese Application Serial No. 201080044371.X, Response filed Jul. 22, 2015, With English Translation of Claims, 22 Pgs.
Chinese Application Serial No. 201080044371.X, Response filed May 23, 2014, With English Translation of Claims, 16 Pgs.
Chinese Application Serial No. 201080044371.X, Response filed Nov. 19, 2015 to Office Action dated Oct. 22, 2015, With English Translation of Claims, 18 Pgs.
Chinese Application U.S. Appl. No. 201080044371.X, Office Action dated Oct. 22, 2015, With English Translation of Claims, 7 Pgs.
Dictionary Definition of Configuration, Retrieved From http://en.wikipedia.org/wiki/computer-configuration on Aug. 10, 2013.
Dictionary Definition of Operating System, Retrieved From http://en.wikipedia.org/wiki/operating-system, Retrieved on Aug. 10, 2013.
Feridun, Metin, et al., Implementing OSI Agent Managers for TMN, IEEE Communications Magazine, (Sep. 1996), 62-67.
German Application Serial No. 112010003144.4, Office Action dated May 8, 2014, With English Translation of Claims, 14 Pgs.
German Application Serial No. 112010003144.4, Response filed Sep. 4, 2014, With English Machine Translation, 38 Pgs.
Gernot Heiser Kevin Elphinstone Ihor Kuz Gerwn Klein Stefan M. Petters, Towards Trustworthy Computing Systems: Taking Microkernels to the Next Level, 2007, pp. 1,8.
Graupner et al. (Resource-Sharing and Service Deployement in Virtual Data Center, IEEE, 2002, pp. 1-6).
International Application Serial No. PCT/US2010/044003, International Preliminary Report on Patentability dated Oct. 5, 2011, 26 Pgs.
International Application Serial No. PCT/US2010/044003, Search Report dated Sep. 23, 2010, 14.
International Application Serial No. PCT/US2010/044003, Written Opinion dated Sep. 23, 2010, 14.
International Application Serial No. PCT/US2010/044009, International Preliminary Report on Patentability dated Nov. 4, 2011, 5 Pgs.
International Application Serial No. PCT/US2010/044009, Search Report dated Sep. 27, 2010, 8 Pgs.
International Application Serial No. PCT/US2010/044009, Written Opinion dated Sep. 27, 2010, 8 Pgs.
International Application Serial No. PCT/US2010/044015, International Preliminary Report on Patentability dated Feb. 9, 2012, 7 Pgs.
International Application Serial No. PCT/US2010/044015, Search Report dated Oct. 4, 2010, 12.
International Application Serial No. PCT/US2010/044015, Written Opinion dated Oct. 4, 2010, 12.

(56) References Cited

OTHER PUBLICATIONS

Jboss (The Jboss JMX Microkernel, docs.jboss.org, May 2009, pp. 1-68).
Kim et al, International Journal of Pharmaceutics, 180 (Dec. 1998) pp. 75-81, Pharmacodynamics of Insulin in Polyrthylene Glycol-Coated Liposomes.
Oracle (Improving DBA Productivity With the Oracle Enterprise Manager 10G Configuration Management Pack, Jan. 2008, Oracle White Paper, pp. 1-14.
Schaefer (Configuration Description, Deployment and Lifecycle Management Component Model Version 1.0, forge.gridforum.org/projects/cddlm-wg, Mar. 2006, pp. 1-56).
Tonouchi, Toshio, et al., An Implementation of OSI Management Q3 Agent Platform for Subscriber Networks, IEEE International Conference, (1997), 889-893.
U.S. Appl. No. 12/714,429, Preliminary Amendment filed Jun. 3, 2011, 12 Pgs.
U.S. Appl. No. 12/831,929, Final Office Action dated Feb. 3, 2014, 13 Pgs.
U.S. Appl. No. 12/831,929, Final Office Action dated Jan. 7, 2013, 16 Pgs.
U.S. Appl. No. 12/831,929, Non Final Office Action dated Aug. 15, 2013, 16 Pgs.
U.S. Appl. No. 12/831,929, Non Final Office Action dated Jun. 21, 2012, 11 Pgs.
U.S. Appl. No. 12/831,929, Notice of Allowance dated Aug. 1, 2014, 16 Pgs.
U.S. Appl. No. 12/831,929, Notice of Allowance dated Dec. 16, 2014, 7 Pgs.
U.S. Appl. No. 12/831,929, Pre-Appeal Brief Request filed May 5, 2014, 5 Pgs.
U.S. Appl. No. 12/831,929, Response filed Apr. 8, 2013 to Final Office Action dated Jan. 7, 2013, 11 Pgs.
U.S. Appl. No. 12/831,929, Response filed Dec. 16, 2013 to Non Final Office Action dated Aug. 15, 2013, 11 Pgs.
U.S. Appl. No. 12/831,929, Response filed Sep. 21, 2012 to Non Final Office Action dated Jun. 21, 2012, 9 Pgs.
U.S. Appl. No. 13/341,778, filed Dec. 30, 2011, Configuring a Service Based on Manipulations of Graphical Representations of Abstractions of Resources.
U.S. Appl. No. 13/341,778, Non Final Office Action dated Feb. 24, 2012, 12 Pgs.
U.S. Appl. No. 13/341,778, Notice of Allowance dated Jul. 18, 2012, 5 Pgs.
U.S. Appl. No. 13/341,778, Response filed May 24, 2012 to Non Final Office Action dated Feb. 24, 2012, 13 Pgs.
U.S. Appl. No. 13/679,632, filed Nov. 16, 2012, Configuring a Service Based on Manipultations of Graphical Representations of Abstractions of Resources.
U.S. Appl. No. 13/679,632, Final Office Action dated Sep. 2, 2015, 11 Pgs.
U.S. Appl. No. 13/679,632, Non Final Office Action dated Mar. 12, 2015, 9 Pgs.
U.S. Appl. No. 13/679,632, Preliminary Amendment filed May 22, 2013, 7 Pgs.
U.S. Appl. No. 13/679,632, Response filed Feb. 2, 2016 to Final Office Action dated Sep. 2, 2015, 9 Pgs.
U.S. Appl. No. 13/679,632, Response filed Jun. 12, 2015 to Non Final Office Action dated Mar. 12, 2015, 9 Pgs.
United Kingdom Application Serial No. 1203172.0, Office Action dated 11-27-14-15, 2 Pgs.
United Kingdom Application Serial No. 1203172.0, Response filed Jan. 28, 2015, 19 Pgs.
Entire Prosecution History of U.S. Appl. No. 12/714,425, titled System and Method to Uniformly Manage Operational Life Cycles and Service Levels, filed Feb. 26, 2010.
Entire Prosecution History of U.S. Appl. No. 12/714,429, titled Cloud Computing: Unified Management Console for Services and Resources in a Data Center, filed Feb. 26, 2010.
Entire Prosecution History of U.S. Appl. No. 12/831,929, titled Automated Failure Recovery of Subsystems in a Management System, filed Jul. 7, 2010.
Entire Prosecution History of U.S. Appl. No. 13/341,778, titled Configuring a Service Based on Manipulations of Graphical Representations of Abstractions of Resources, filed Dec. 30, 2011.
Entire Prosecution History of U.S. Appl. No. 13/679,632, titled Configuring a Service Based on Manipulations of Graphical Representations of Abstractions of Resources, filed Nov. 16, 2012.
Entire Prosecution History of U.S. Appl. No. 14/685,185, titled Automated Failure Recovery of Subsystems in a Management System, filed Apr. 13, 2015.
Entire Prosecution History of U.S. Appl. No. 15/066,746, titled System and Method to Uniformly Manage Operational Life Cycles and Service Levels, filed Mar. 10, 2016.
Entire Prosecution History of U.S. Appl. No. 15/672,275, titled Configuring a Service Based on Manipulations of Graphical Representations of Abstractions of Resources, filed Aug. 8, 2017.

\* cited by examiner

AUTOMATED FAILURE RECOVERY OF SUBSYSTEMS IN A MANAGEMENT SYSTEM

CROSS-REFERENCE TO RELATED APPLICATIONS

This application is a continuation of U.S. patent application Ser. No. 14/685,185, filed on Apr. 13, 2015, now U.S. Pat. No. 10,129,176, issued on Nov. 13, 2018; which is a continuation of U.S. patent application Ser. No. 12/831,929, filed on Jul. 7, 2010, now U.S. Pat. No. 9,009,521, issued on Apr. 14, 2015; which claims the benefit of U.S. Patent Application Ser. No. 61/230,584, filed on Jul. 31, 2009; the disclosures of all of these applications and patents are incorporated by reference herein.

TECHNICAL FIELD

The present application relates to systems and methods for automated failure recovery of subsystems in a management system that is used for managing services and resources in a datacenter or cloud computing environment.

BACKGROUND

In a data center environment, there exist many services to accomplish business objectives or to support other services. In some contexts, these services may include trading (sell item, view item for sale, etc.), messaging, and search. All of the services consume hardware and software resources. Examples of hardware resources include compute (servers), network (switches, load balancers, firewalls, etc.), storage (SAN, NAS, etc.), and those for the latter include operating system, application platform stack (java virtual machine, tomcat servlet container, etc.), and database. These hardware and software resources are arranged in different configurations depending on the requirements of the particular service. The configurations are referred to as "deployment architectures." Examples of deployment architectures include the traditional 3-tier architecture (web tier, app tier, database tier each of which may have load balancer for traffic distribution), a messaging infrastructure, etc. Within these there may be variations, for example, load balancers may be deployed in a pair to provide high availability (HA). Traditionally, there have been management systems for each subset of the data center environment. For example, there are network management systems focused on managing (e.g., configuring, health checking, performance monitoring, etc.) switches. Others focus on applications (e.g., application deployment, etc.). This leads to a proliferation of management systems.

BRIEF DESCRIPTION OF THE DRAWINGS

Some embodiments are illustrated by way of example and not limitation in the figures of the accompanying drawings in which.

DETAILED DESCRIPTION

Figure 1:
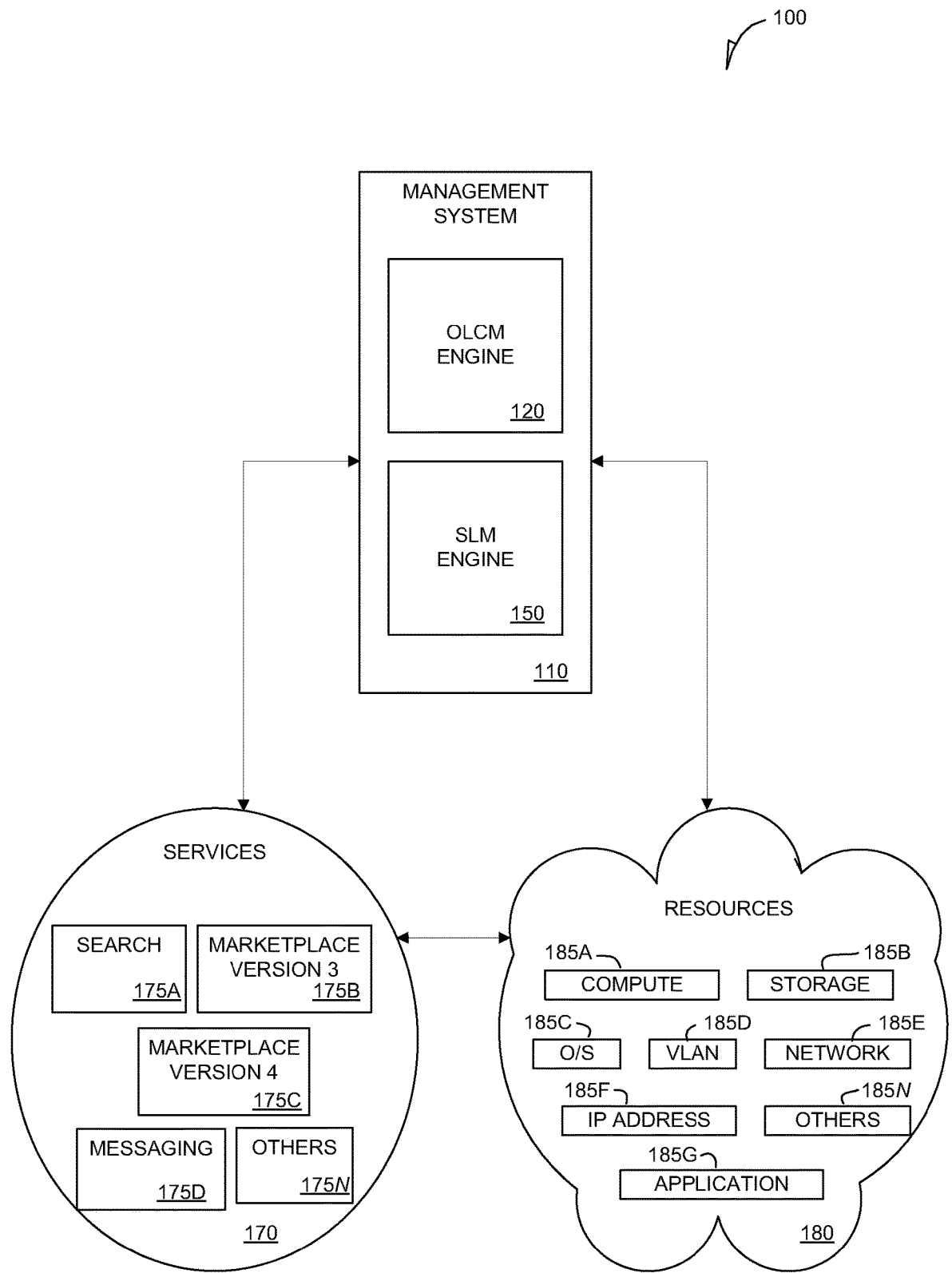
FIG. 1 is a block diagram of a network environment in which various embodiments may be practiced.

Example methods and systems for a management system to monitor and automatically recover from failures of its internal subsystems are described. In the following description, for purposes of explanation, numerous specific details are set forth in order to provide a thorough understanding of example embodiments. It will be evident, however, to one skilled in the art that the present invention may be practiced without these specific details.

In a large enterprise computing system, services are provided using different systems. Examples of such systems provide trading services, search services, messaging services, payment services, and web publishing services. Because each system performs separate functions, the operation of an enterprise computing system, as a whole, depends on the performance of each of the other systems. This is particularly true where more than one system is used to execute a transaction or "flow." For instance, to complete a sale in an Internet commerce system, the systems corresponding to the search, web publishing, payments, and messaging services may be used at particular times in the flow.

The systems are implemented using one or more resources. The resources may be hardware resources and/or software resources. Examples of hardware resources include servers, routers, load balancers, and the like. Examples of software resources include operating systems, applications, and the like.

In the context of a management system, each managed entity (i.e., a service or a resource) is modeled in terms of its operational configuration, performance, and status (for example, active status). Further, each such modeled entity is related to one or more modeled entities to reflect the real-world relationships. For example, a computer program (an application) runs on an operating system, and therefore the corresponding modeled entities inside the management system also reflect this relationship. The resulting model of modeled entities (each entity consisting of attributes specifying its configuration, performance and status) and their inter-relationships is known as an Information Model. The Information Model is created in a modeling tool and stored in a model repository to be used by, for example, system architects.

Each type of service has a deployment architecture that shows the various constituent resources, their inter-relationships, and their dependencies on other services, if applicable. In the context of a model-driven management system, each service's deployment architecture can be specified in terms of a specific Information Model. In this context, the Information Model is referred to as a deployment profile ("profile"). Thus the profile is used to specify the deployment architecture in terms of its functional and non-functional criteria. To illustrate, the simplest profile may be "N number of servers" where the servers may be contiguously assigned. Another profile may correspond to the traditional 3-tier architecture consisting of load balancers, servers to be used as web servers, servers to be used as application servers, servers to be used as database servers, and a layer-3 switch to provide LAN switching and layer-3 routing between VLANs. The three types of servers may have different capabilities (e.g., database servers may be big-iron boxes and the web servers may be blade servers or even virtual machines). Other variations may result in a different profile, for example, load balancers may be arranged in an active-active (or active-passive) configuration to provide high availability.

Yet another profile may use the 3-tier profile to generate a profile of another service. For example, a profile may specify that the web server (software) is to be deployed on tier-1 servers, that application servers (software) are to be deployed on tier-2 servers, and that a database is to be deployed on tier-3 servers, and so on. In these profiles, the application code to be deployed in the application servers may depend on other services (for example, a logging service).

When a service is to be deployed, its deployment configuration is specified in terms of number and type of resources, configuration parameters of resources individually and/or by type, and then suitable resource instances are identified and allocated. Doing so allows the management system to automate the deployment and other life cycle management tasks. In the context of the present invention, such information is captured in a specification called a deployment topology (henceforth called a topology). A topology is a realization of a profile. The specification of a topology progresses in two stages—logical and physical. A logical topology specifies the abstract types of resources and their cardinalities (e.g., 10 blade servers) and a physical topology specifies both the concrete types of resources and their specific instances (e.g. IBM LS 20 blade server with asset id 54321abcde).

A Service Manager is responsible for the complete life cycle and service level management of a service. Examples of life cycle operations include deployment, configuration, start, activate, update, etc. and these operations can be carried out on the service as a whole or on specific or grouped resources that are used by the service. Each instance of a Service Manager can manage multiple service instances conforming to the same profile. The specificity is in the Controllers that are specific to an abstract resource type (e.g. load balancer) and in the Adaptors that are specific to a concrete resource type (e.g. Citrix NetScaler load balancer). When the service is first deployed, the Service Manager parses the topology and dynamically loads the corresponding Controllers and associated Adaptors for each unique service and resource specified.

Each Controller within a Service Manager manages multiple instances of the same service or resource type since it is defined per abstract type. For example, a single load balancer controller is used to manage all the load balancers in the service regardless of the particular make or model of load balancer used. Adaptors are specific to concrete types (e.g., a particular make or model) and translate the generic commands to commands specific to the implementation. For example, there is a NetScaler load balancer adaptor, a F5 BigIP load balancer adaptor, and so on. As such to introduce support for a Zeus load balancer, only its adaptor is provided. To introduce a new type, for example, an SSL accelerator, its controller and adaptors for the concrete types (e.g. adaptor for Coyote Point's SSL accelerator) is provided. The examples cited above are hardware specific, but the concept is applicable to software types as well.

The Information Model elements corresponding to various resource and service types and the associated management semantics are confined to the Controllers and Adaptors inside a Service Manager. The rest of the management system (including Service Manager Components other than Controllers and Adaptors) operates at a higher level of abstraction of the Information Model. This abstraction is referred to as a meta-model. Since the subsystems are to operate at the level of the meta-model, they are unaffected by the changes made in an existing profile or by the introduction of a new profile as long as the profile conforms to the meta-model. Thus, using a meta-model allows the management of new services whose profiles may perhaps contain new model elements (e.g. a new type such as an SSL accelerator).

The meta-model defines the following eight meta-objects: Service, Resource, Part, Configuration, Performance, Capability, Group, and Application Data. A Resource meta-object also has sub-types. The meta-model also specifies the relationships between these meta-objects. Each type in a profile is classified (i.e., sub-typed) as one of the meta-objects. For example, each resource in a profile is sub-typed as one of the Resource sub-types in the meta-model. As a concrete example, load balancer, switch, router, firewall are sub-typed from Network Element that, in turn, is sub-typed from Hardware Resource. The Hardware Resource is, in turn, sub-typed from a Resource. To introduce a new entity, for example, an SSL accelerator, the new entity may be derived from a Network Element (which by generalization also makes it a Hardware Resource and a Resource).

The meta-model can be viewed as a model for creating profiles. A user or domain expert (e.g. Application Architect) wishing to introduce management capabilities for a new service can inspect the model repository and choose from the available resource types, and create (if needed) new resource or service types specific to his domain. The newly created types are sub-classed from the existing meta-objects or sub-types. Next, the domain expert can create the appropriate relationships and cardinalities between the various service and resource types and thereby create a new profile. This profile is then versioned and stored in the management system.

For the management system to use the configuration, cardinality, resource binding, and relationship information as specified in the topology, the management system creates a programmatic representation of the types internally. This is done so by creating class definitions from the profile. When a topology is specified as an input, the management system can generate the corresponding objects from which the said information can be obtained. In one example implementation, the profile may be represented by XML Schema and the topology by an XML instance document. Then using JAXB framework, the Java class representations may be generated and, at runtime, the topology may be parsed to create the corresponding Java objects.

The services are collectively managed, in turn, by service managers within the management system using a set of management services within the same system. Each management service has defined roles and responsibilities within the architecture. The term "manage" and variations thereof are used herein to refer collectively to operational life cycle management (OLCM) and service level management (SLM). In general, SLM includes activities pertaining to monitoring, alerting, and managing Service Level Objectives (SLOs) through dynamic resource allocation, regulating load on the system (for example, by admission control), and failure recovery. The management services themselves are a part of a microkernel architecture where each management service is built as a service using a Service Oriented Architecture (SOA) framework.

Because each management service is itself built as a service, it is managed in the same way the other services deployed in the data center or cloud are managed by the Management System. More specifically, the services are managed using service managers (that are part of the Management System). The service managers themselves are, in turn, controlled by one or more microkernel controllers within the microkernel.

FIG. 1 is a block diagram 100 of an exemplary infrastructure environment, such as a data center, and is shown to include relationships between services 170, resources 180, and a management system 110. The services 170 can include, for example, search services 175A, version 3 marketplace services 175B, version 4 marketplace services 175C, messaging services 175D, and any other service 175N that utilizes resources and can be managed. The resources 180 can include, for example, computer resources 185A, storage resources 185B, operating system resources 185C, VLAN resources 185D, network resources 185E, IP address resources 185F, application resources 185G, and any other resource 185N that the services 170 may utilize. In an example embodiment, the management system 110 includes an operational lifecycle management (OLCM) engine 120 for, among other things, deploying the services 170 such that they use resources selected from the resources 180. In an example embodiment, the management system 110 also includes a service level management (SLM) engine 150 for, among other things, monitoring the services 170 and the resources 180 and dynamically allocating at least one of the resources 180 such that each of the services 170 maintains a specific service level as defined by key performance indicators (KPIs), such as mean response time or throughput. In certain embodiments, the OLCM and SLM engines are realized in a service manager which utilizes the services of various management services.

In an example embodiment, the services 170 and the resources 180 are coupled to the management system 110 such that the management system 110 can manage the services 170 and the resources 180 using the OLCM engine 120 and the SLM engine 150. In an example embodiment, ones of the services 170 and one or more of the resources 180 are coupled such that one or more of the resources 180 are allocated for ones of the services 170 or ones of the services 170 are deployed such that they use one or more of the resources 180.

Figure 2:
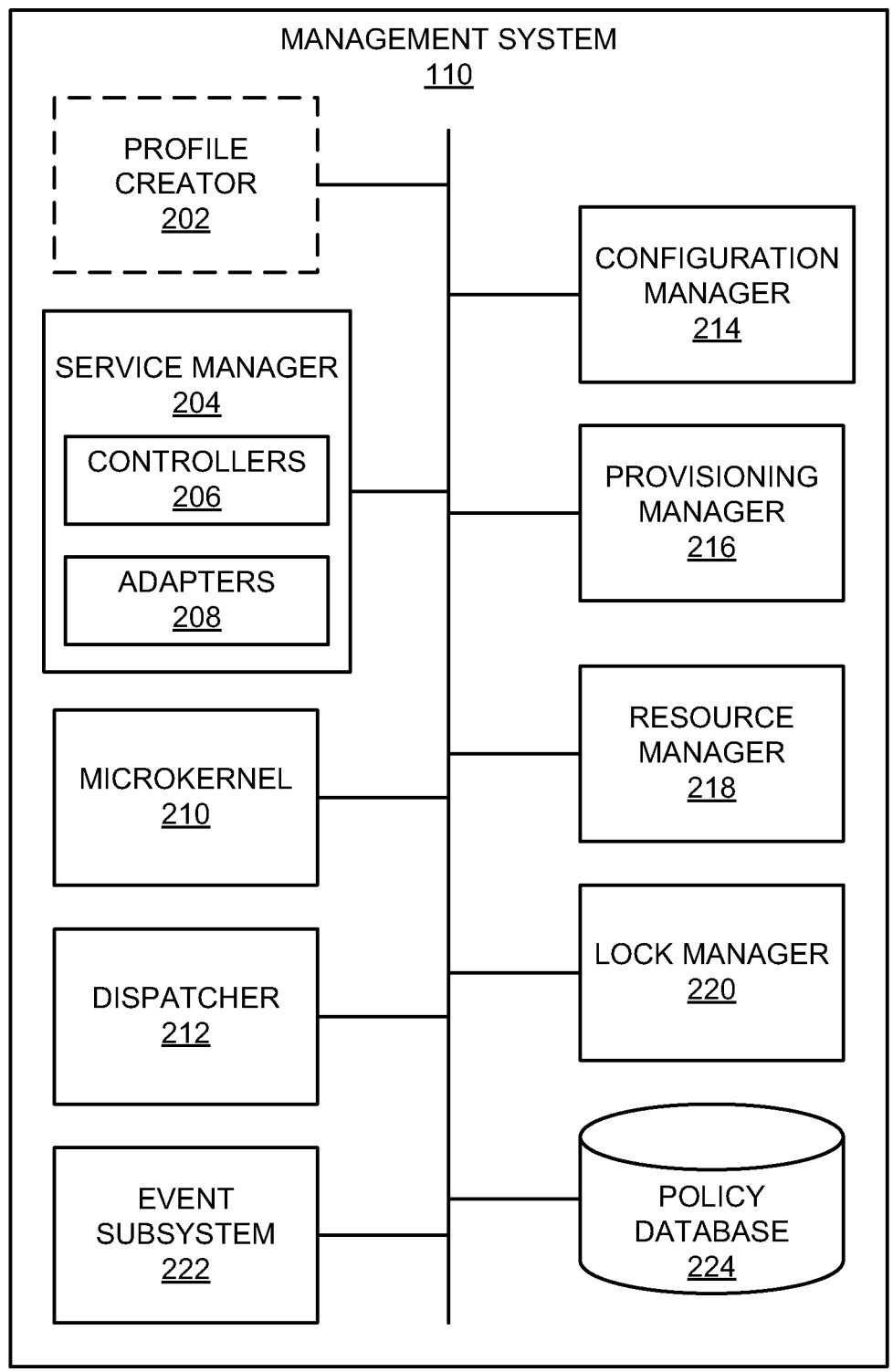
FIG. 2 is a block diagram of a management system according to various embodiments.

FIG. 2 is a block diagram of the management system 110 according to various embodiments. The management system 110 comprises an optional profile creator 202, one or more service managers 204, a microkernel 210, a dispatcher 212, a configuration manager 214, a provisioning manager 216, a resource manager 218, a lock manager 220, an event subsystem 222, and a policy database 224. The management system 110 provides operational life cycle management, dynamic resource allocation, and service level management capabilities for the managed services and constituent resources.

Figure 8:
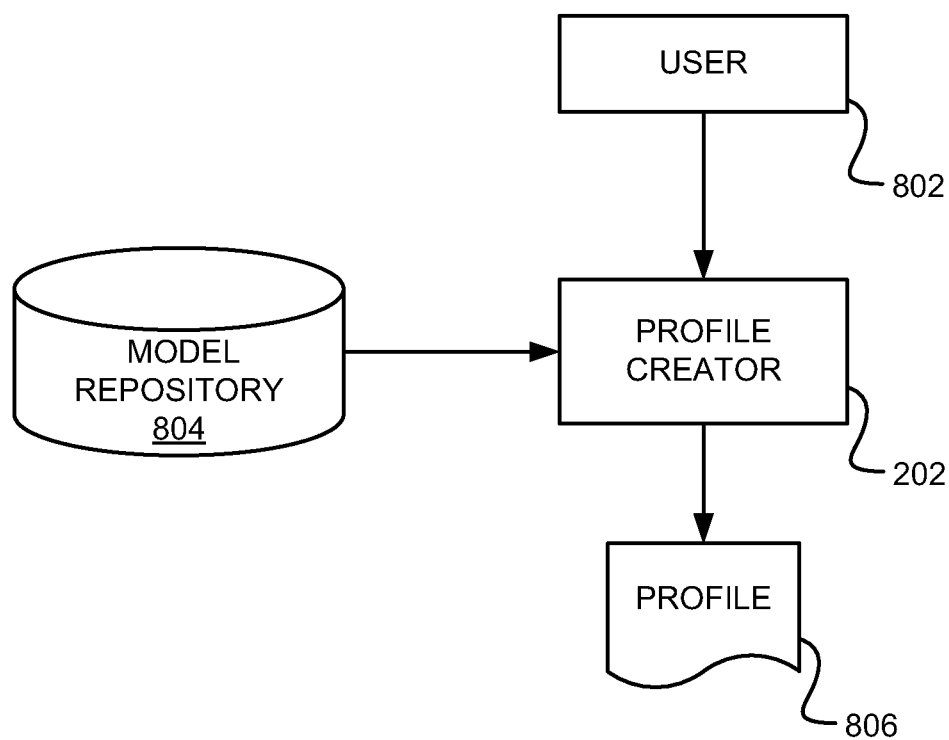
FIG. 8 is a block diagram of a profile creator according to various embodiments.

Referring now to FIG. 8, an example profile creator 202 is depicted. The profile creator 202 may be external to the management system 110 in some instances. The profile creator receives one or more inputs from a user 802 (e.g., a domain expert) and accesses a model repository 804. The model repository 804 stores models and meta-models of services and resources. The user 802 reuses model elements from the model repository 804 as appropriate to the deployment architecture of the service type being created. If new model elements need to be created, the user 802 creates their definitions in the tool. Further, each newly created model element is subclassed from a meta-object or from one of the Resource subtypes as appropriate. Dependency and parent-child relationships between the model elements can be created as needed. If dependencies exist between the target profile and other profiles (that is, the target service type depends upon another service type), such dependencies can also be created. In one example embodiment, the model for the deployment architecture may be created in UML and then the UML representation may be transformed into a XML Schema representation. Subsequently, the XML Schema may be compiled using JAXB to produce the Java class representations. Once the profile is created, it is then exported from the tool and versioned and stored in the management system.

When a new service instance has to be created and deployed, the user (for example, an Operations Architect) uses a Topology Editor to create the topology. The topology so created is a logical topology. A logical topology indicates abstract types of resources (e.g., "server," "load balancer," "switch," etc.) and how many (e.g., cardinality) of each of the resources to be used. Subsequently, resource bindings are created for the abstract resource in a two-step process—binding the abstract resource type to a concrete resource type (e.g., "NetScaler Load Balancer," "Cisco 3550 Switch," "LS20 Server," etc.), and then binding to an actual resource instance. This results in the creation of a physical topology. In some instances, the management system 102 may lazily bind the concrete resource type to an actual resource instance when the service is deployed. The service manager 204 manages service and constituent resources according to the profiles within the datacenter 104 or the cloud computing environment 106. More specifically, the service manager 204 provides service level management (SLM) and operational life cycle management (OLCM) for the service and constituent resources. Based on the physical topology, the service manager 204 initiates, manages, and/or terminates execution by the actual resources in the data center 104 and/or the cloud computing environment 106 to provide the service.

The service manager 204 comprises a controller 206 that is specific to a service or resource type. It is responsible for the complete life cycle and service level management of all the service/resource instances under its control. As such, each service manager 204 may include more than one controller 206 for services that consume more than one type of resource.

The service manager 204 further comprises adapters 208 which provide a transformation of commands received from the controller 206 to native commands executable by the concrete resource instance(s). The controller 206 may access a distinct adapter 208 for each concrete resource type. A single adapter may be used to communicate with more than one instance of the same concrete resource type.

The microkernel 210 provides life cycle and service level management for each subsystem (e.g., the service manager 204, the dispatcher 212, the configuration manager 214, the provisioning manager 216, the resource manager 218, and the lock manger 220). It also provides a service registry capability, and a service lookup capability to register and lookup the service endpoints of the subsystems respectively.

The dispatcher 212 serves as the entry point into the management system 102. It receives all client requests, determines the subsystem to which the request is targeted by doing a lookup in the microkernel 210 and then dispatches the request to the target subsystem. It also provides user authentication and authorization for the management system 102, and creates and maintains user sessions. User authentication may be delegated to another server distinct from the management system 102. User authorization may be performed internally based on roles and privileges of a particular user. Upon successful authentication and authorization, a user session is created, and the session persists until a period of time is elapsed or when the user logs out.

The configuration manager 214 may store and/or access existing profiles and/or their corresponding topologies (e.g., logical or physical) stored in a configuration repository. In some instances, the configuration repository may be implemented using a relational database management system (RDBMS) or may be a configuration management database (CMDB).

The configuration manager 214 may operate at the level of the meta-model instead of at the level of the model elements in the profiles in order to maintain independence from individual deployment architectures/models. The configuration manager 214 may transform the topology (stored, for example, as an XML document) into relational database tables based on the corresponding meta-objects. The configuration manger 214 may further create and maintain version vectors for the profiles, topologies (both logical and physical), and individual objects within the topology to allow the management system 102 to roll back (or forward) a service to a previous (or later) version of its deployed topology. The configuration manager 214 may additionally verify the deployed configurations and ensure that there is no configuration drift in the resources. When a configuration drift is detected, the relevant service manager 204 of the affected resource can take appropriate corrective actions.

The provisioning manager 216 is responsible for the deployment of resources including an operating system, application stack (e.g., Java Virtual Machine (JVM), Servlet Container), and application code to compute elements (e.g., servers). Since a variety of specialized products and tools may be available, the provisioning manager 216 provides a service layer to abstract those products and tools using adaptors 208. Examples of such tools include, but are not limited to, Symantec's Altiris for OS deployment and eBay's application provisioning tool for application stack and code deployment.

The resource manager 218 is responsible for reserving and allocating actual, concrete resources. Reservations may be leased, that is, the reservations expire if not used by a particular service by a particular time. The reservations may be permanent (or up to a specified maximum duration) by performing a resource allocation based on a service deployment command issued by the user (e.g. a systems administrator). The resource manager 218 may further dynamically assign resources and periodically adjust the resource allocation between services.

The lock manager 220 may operate to prevent concurrent access to a shared resource. In some instances, resources are shared between different services. If multiple service managers 204 access a shared resource concurrently, there is a chance of creating inconsistency in the resource's configuration as not all resources enforce or provide serialized access. Therefore, an out-of-band synchronization or mutual exclusion mechanism can be provided. To access a resource, the service manager 204 first obtains a lock from the lock manager 220 and relinquishes the lock after its session with the managed resource is over. Locks are leased, that is, they expire after a specified duration. A lease may be extended subject to some tunable maximum as needed. Locks are also reentrant and persistent across reboots.

Event subsystem 222 is used to publish and process events internal to the management system 110. These events pertain to those published and consumed between the various management services, and also those that pertain to the management of the management services themselves. There also exists an external event system conceptually situated between the managed resources and services, and the management system 110. The internal event subsystem and the external event system consist of an event transport system and an event processing system. In some embodiments, these systems within the event subsystem and the event system may be implemented using different technologies and therefore will have different instances whereas in some embodiments they may be implemented on the same technology but have separate instances. In yet another embodiment, the event system and the event subsystem may be one and the same. In the embodiments shown herein, the two systems are assumed to share the same implementation but have different instances.

Policy database 224 is a repository of various management policies that are used to effect control and failure recovery actions on the managed resources and services by the respective Service Managers.

The management system 110 may be distributed across different servers or may be installed on a single server depending on the imposed load and other operational considerations. Each server implementing at least a portion of the management system 110 may have one or more agents that are used to perform life cycle actions on the management services on behalf of their respective service managers. Examples of such agents are IBM Tivoli and HP OpenView agents. These agents can be accessed over the network so that if the Service Manager resides on a different server than the management service it manages, it can communicate with the agents. These agents are also used to perform life cycle actions on the Service Managers themselves on behalf of their respective microkernel controllers.

Figure 3:
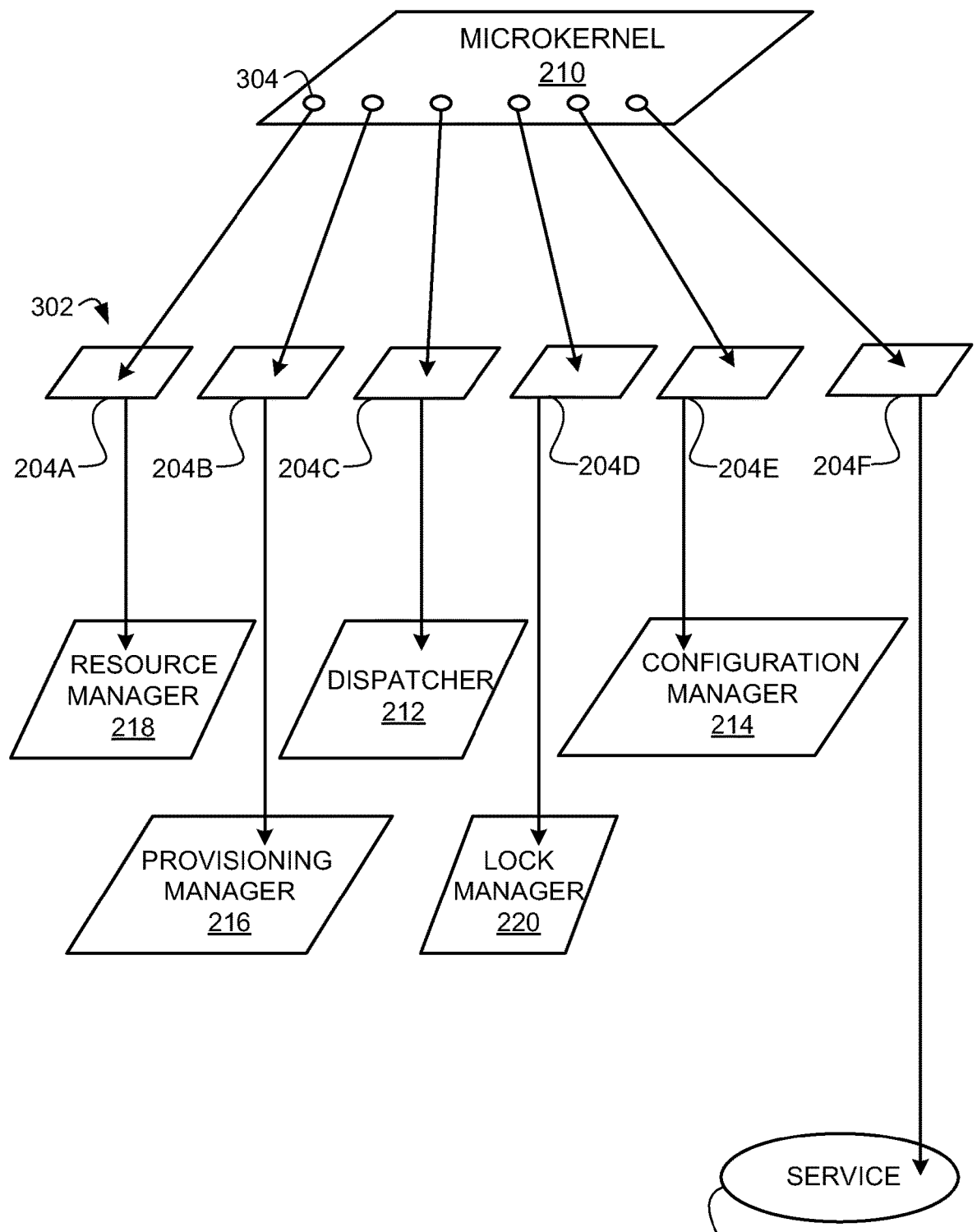
FIG. 3 is a hierarchal diagram of the management system according to various embodiments.

FIG. 3 is a hierarchal diagram of the management system 110 according to various embodiments. The management system 110 is based on a microkernel architecture pattern where each subsystem is built as a service. As discussed with respect to FIG. 2, the management subsystems of the management system 110 comprise the dispatcher 212, the configuration manager 214, the provisioning manager 216, the resource manager 218, and the lock manager 220. The dispatcher 212 and configuration manager 214 are examples of management services. It is noted that the management system 110 may include more or fewer components than those described in connection with FIG. 3 such as the event subsystem 222 and a means for accessing the policy database 224. Further, the management system 110 manages one or more services 170.

The microkernel 210 performs lookup and registry operations within the management system 110. The microkernel 210 operates as the anchor of the management system 110 as it is where each recursion within the management system 110 ends. Because the microkernel 210 operates as the anchor, it is made highly available in the event of a failure or performance lag. Examples of systems that may be used to implement the microkernel 210 include, but are not limited to JINI® network architecture developed by Sun Microsystems of Santa Clara, Calif. and VERITAS® cluster server created by Symantec of Mountain View, Calif. Other clustering systems and network architectures may also be used.

The microkernel 210 comprises a plurality of microkernel controllers 304. Unlike the service controller 206 within the service manager 204, each microkernel controller 304 may manage a service manager 204. Each of the microkernel controllers 304 operate to deploy and register each of the service managers 204 in a service layer 302. The microkernel controllers 304 in the microkernel 210 may correspond to the service manager 204 in a one-to-one relationship as depicted by the arrows between the microkernel controllers 304 and the service managers 204.

The service layer 302 may provide additional scalability and availability to the management system 110. Further, the service layer 302 may allow the management system 110 to operate autonomously without an external management system to operate the management services. The service layer 302 comprises a plurality of service managers 204. A portion of these service managers, namely service managers 204A, 204B, 204C, 204D, and 204E manage a management service, namely the resource manager 218, the provisioning manager 216, the dispatcher 212, the lock manager 220 and the configuration manager 214, respectively. Alternatively, if these management services have the same profile, a single service manager can manage all management services. Other service managers 204 (e.g., service manager 204F) manage the domain services (e.g., service 170). The service managers 204 managing the management services and the service managers 204 managing the services 170 perform the same functions for the service being managed. The service managers 204 for the management services may have additional capabilities and also may use different implementation artifacts to perform the same functions as those done by the service managers 204 managing the domain services 170.

Figure 9:
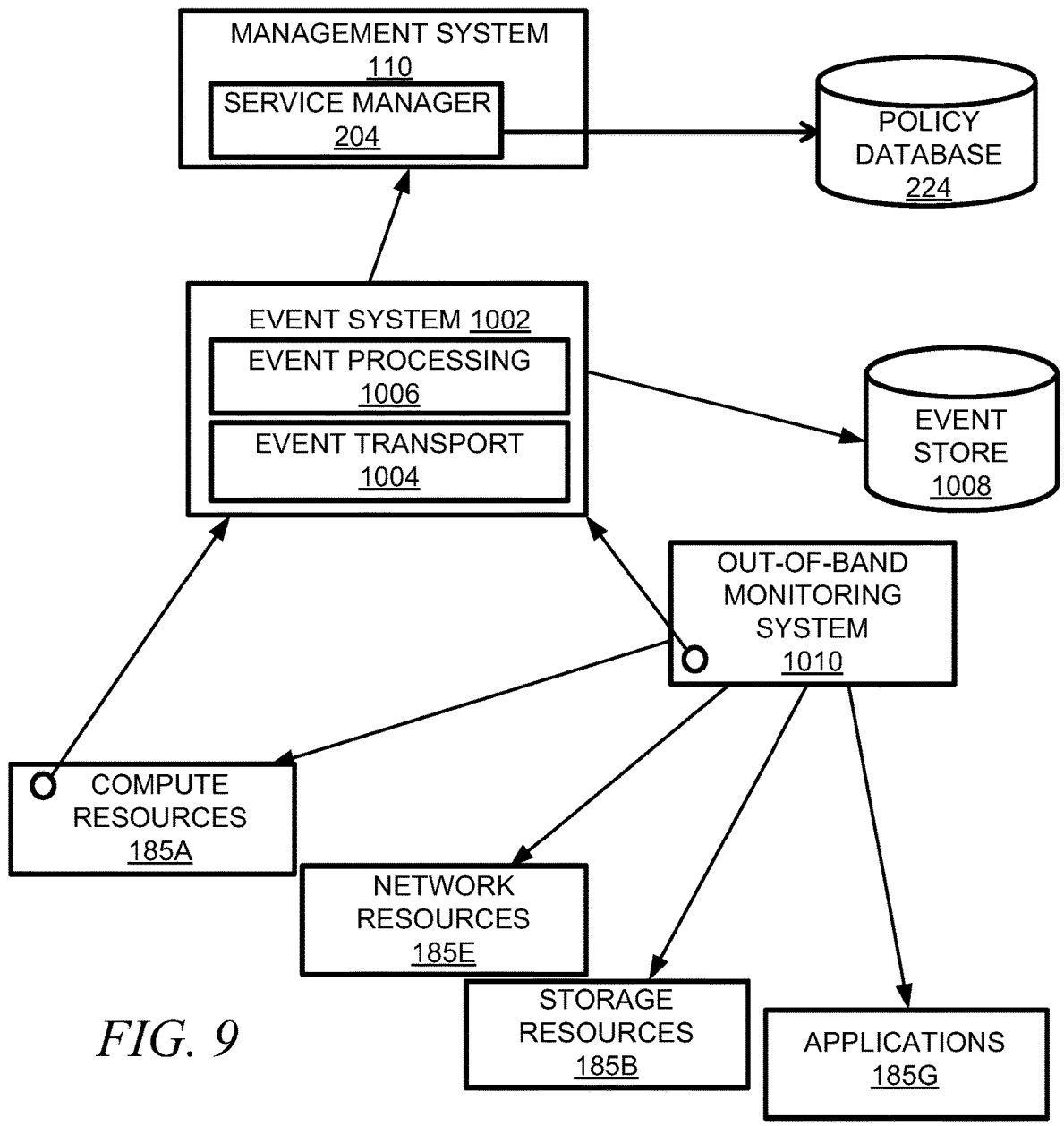
FIG. 9 is a block diagram of the management system, an event system, and an out-of-band monitoring system to manage the service levels according to some embodiments.

To manage the service levels, the management system 110 may use an external event system 1002 and an out-of-band monitoring system 1010 as shown in FIG. 9. The event system 1002 consists of an event transport module 1004 such as TIBCO or AMQP or equivalent message bus, and an event processing module 1006 based on Complex Event Processing (CEP) or Event Stream Processing (ESP) technology. The event system 1002 may be used to send both performance metrics (which are measured at regular intervals) and events (which occur asynchronously). The event system 1002 may do duplicate event suppression and also advanced correlation and aggregation. For example, it may filter out secondary and tertiary events, and only transmit the primary events. The out-of-band monitoring system 1010 is used to perform liveness testing of managed resources, for example, by pinging them, as well as to monitor performance metrics by using SNMP or technology-specific agents installed on the managed resources. Examples of such systems include Nagios, Ganglia, etc. After metrics are collected, a custom agent (installed on the server hosting the out-of-band monitoring system) may transmit them through the event system 1002. Thus, the event system 1002 is used to obtain all performance metrics and events for all managed resources.

Each managed compute resource 185A may have one or more agents (depicted in FIG. 9 as a small circle) installed. These agents are used to perform life cycle operations such as starting and stopping the various managed resources hosted on the compute resource 185A. These agents are also used to perform such actions on the compute resource 185A itself. These agents can also be used to transmit performance metrics as well as events to the management system 110 via the event system 1002. The agents also normalize the metrics and events to conform to the information model understood by the management system 110. (As used here, both metrics and events are referred to as events.)

The event system 222 works on the publish/subscribe model, that is, event producers publish events through the event system 222 and event consumers subscribe to events of interest. To perform trending analysis, comparing of current metrics against historical data, and enable replaying of events to consumers who may have been offline while the events of interest were published, an event store 1008 may be provided. As such this event store 1008 is always a consumer for all published events. This event store 1008 may be realized by using a RDBMS or equivalent.

Determination of failure of a managed resource is done by the event processing module 1006. It does so by building a composite picture based on the topology, events received (or not received) from the agents resident on the managed resources, and events received from the out-of-band monitoring system 1010. Doing so helps it to identify causal events. Once a causal event is identified the event processing module 1006 generates and publishes the relevant failure event. In an example embodiment, applications may exhibit failure characteristics (such as non-responsiveness) and there may also be intermittent failures on a network switch port both of which may be detected and reported by monitoring systems. The event processing module 1006 with its knowledge of the topology may actually determine that the network switch port failure is the causal event and therefore inform its subscribers by generating and publishing the network switch port failure alert.

Each Service Manager 204 may subscribe to events specific to the topologies under its control. When such events are received, these are dispatched internally to the specific controllers. For example, events for a web application are dispatched to the web application controller within the Service Manager. Each controller then decides if the events received may adversely affect the service level objectives (SLOs) for the managed resource or service (this may happen, for example, if the managed resource has failed). If such a determination is made then the controller takes corrective action(s). The selection of a corrective action is done by retrieving the relevant policy from a policy database. Examples of corrective action include, but are not limited to, restarting a failed application, or replacing a failed compute resource with another and redeploying all the hosted applications on the failed compute resource to the replacement compute node. Replacement actions also involve modifications to the physical topology since the concrete resource bindings have to be modified as well.

Figure 4:
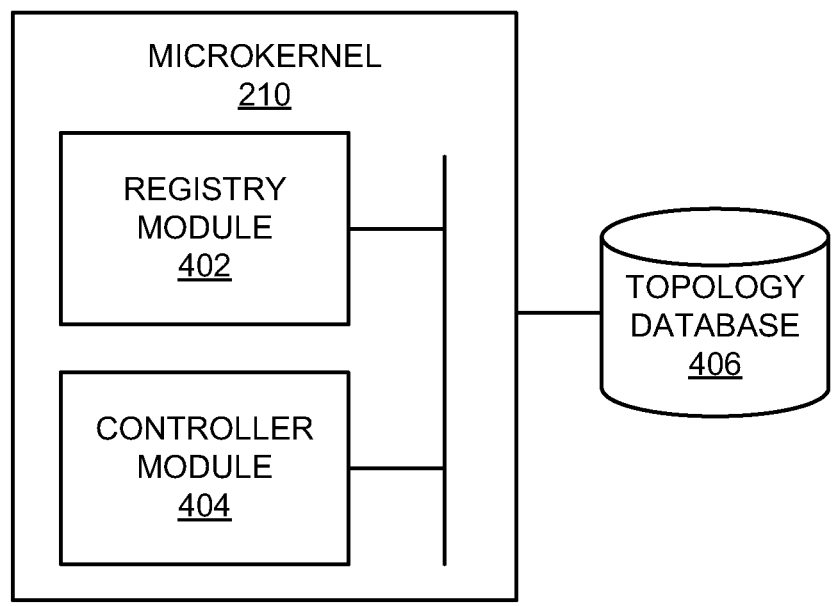
FIG. 4 is a block diagram of a microkernel according to various embodiments.

FIG. 4 is a block diagram of a microkernel 210 according to various embodiments. The microkernel 210 comprises a registry module 402, a controller module 404, and has access to a topology database 406.

The registry module 402 is responsible for storing and accessing the registry entries of the service managers 204 in the service layer 302. The registry module 402 may additionally store registry information corresponding to the management services. In operation, the registry module 402 provides lookup services to the service managers 204.

The controller module 404 instantiates the microkernel controllers 304 corresponding to each service manager 204 on startup or as needed during operation.

Each management service has an associated topology. These topologies are stored in the topology database 406. These topologies may be stored as logical topologies. When the management system is first installed, the installer is given the list of resources (including compute servers) to be used by the management system. Using these values, the installer creates the physical topologies. Upon startup, the topology database 406 is accessed to deploy the management services. It is noted that during operation, some-predefined topologies are also accessible from the configuration manager 214.

Figure 5:
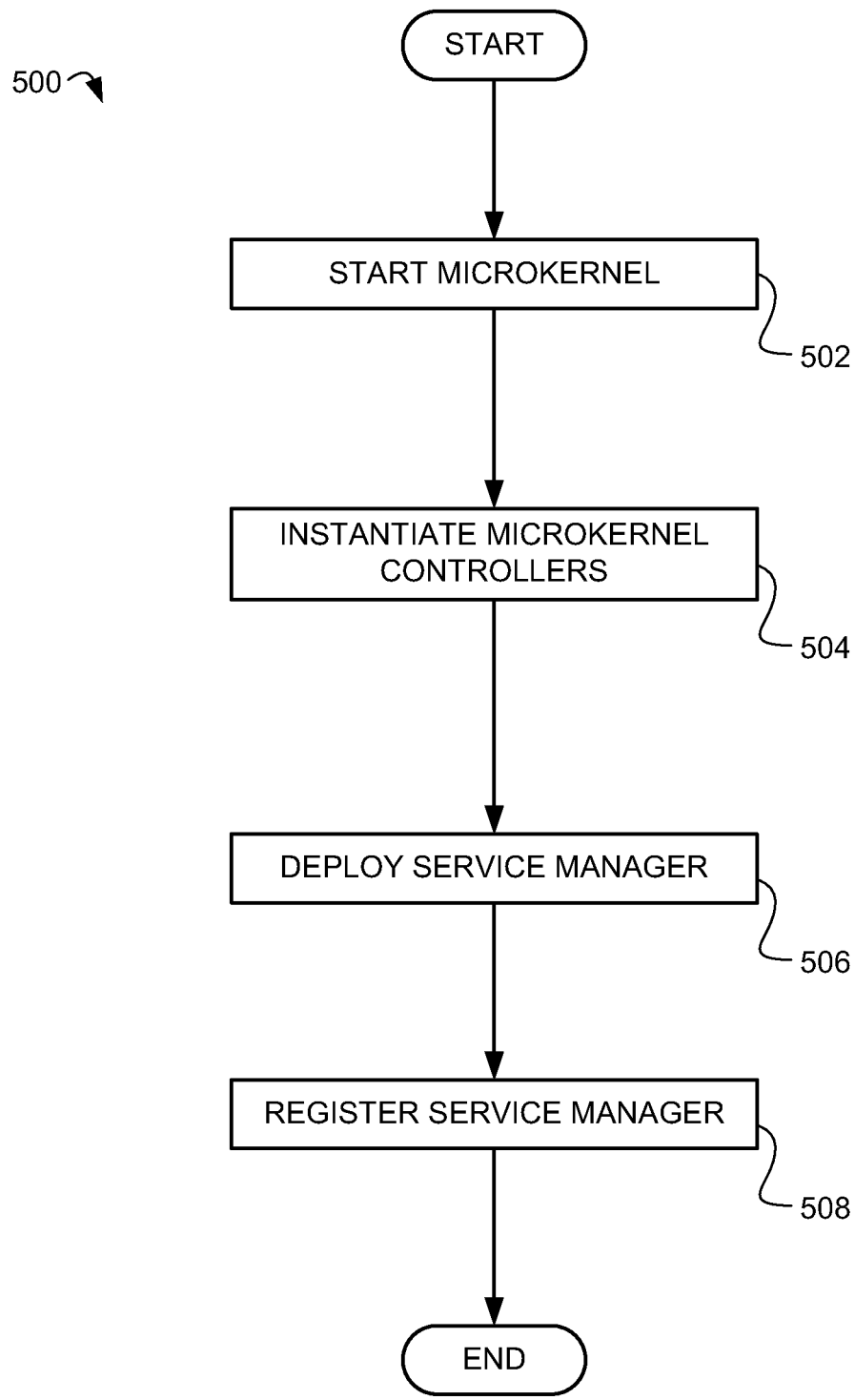
FIG. 5 is a flowchart of a process performed at a microkernel to deploy a service manager according to various embodiments.

FIG. 5 is a flowchart of a process 500 performed at a microkernel 210 to deploy a service manager 204 according to various embodiments. The process 500 (or portions thereof) may be performed upon startup and/or during operation to redeploy the service manager. In some instances, a portion of the process 500 is performed during operation to deploy a requested domain service that is not already deployed.

In an operation 502, the microkernel 210, itself, is started. Upon startup, the microkernel 210 instantiates the microkernel controllers 304 in an operation 504. The microkernel controllers 304 corresponding to service managers 204 for the management services (e.g., dispatcher 212, configuration manager 214, provisioning manager 216, resource manager 218, and lock manager 220) may be deployed before the microkernel controllers 304 corresponding to the service managers 204 for the services 170.

In an operation 506, the microkernel controllers 304 deploy the service managers 204 in the control layer 302. The profile for a service manager 204 is bundled with the management system (not shown). Since the number of service managers in the system is not known in advance or the servers on which they may be deployed, their topologies are created dynamically by the microkernel 210. The deployment is done through the agents installed on the server hosting the service manager 204. In an operation 508, the deployed service manger 204 is registered by the registry module 402 in the microkernel 210. During operation, the service manager 204 is monitored by its respective microkernel controller 304. The microkernel controller 304 may redeploy the service manager 204 in the event of a failure or take other policy-based actions in case of other problems, for example, performance lag.

Figure 6:
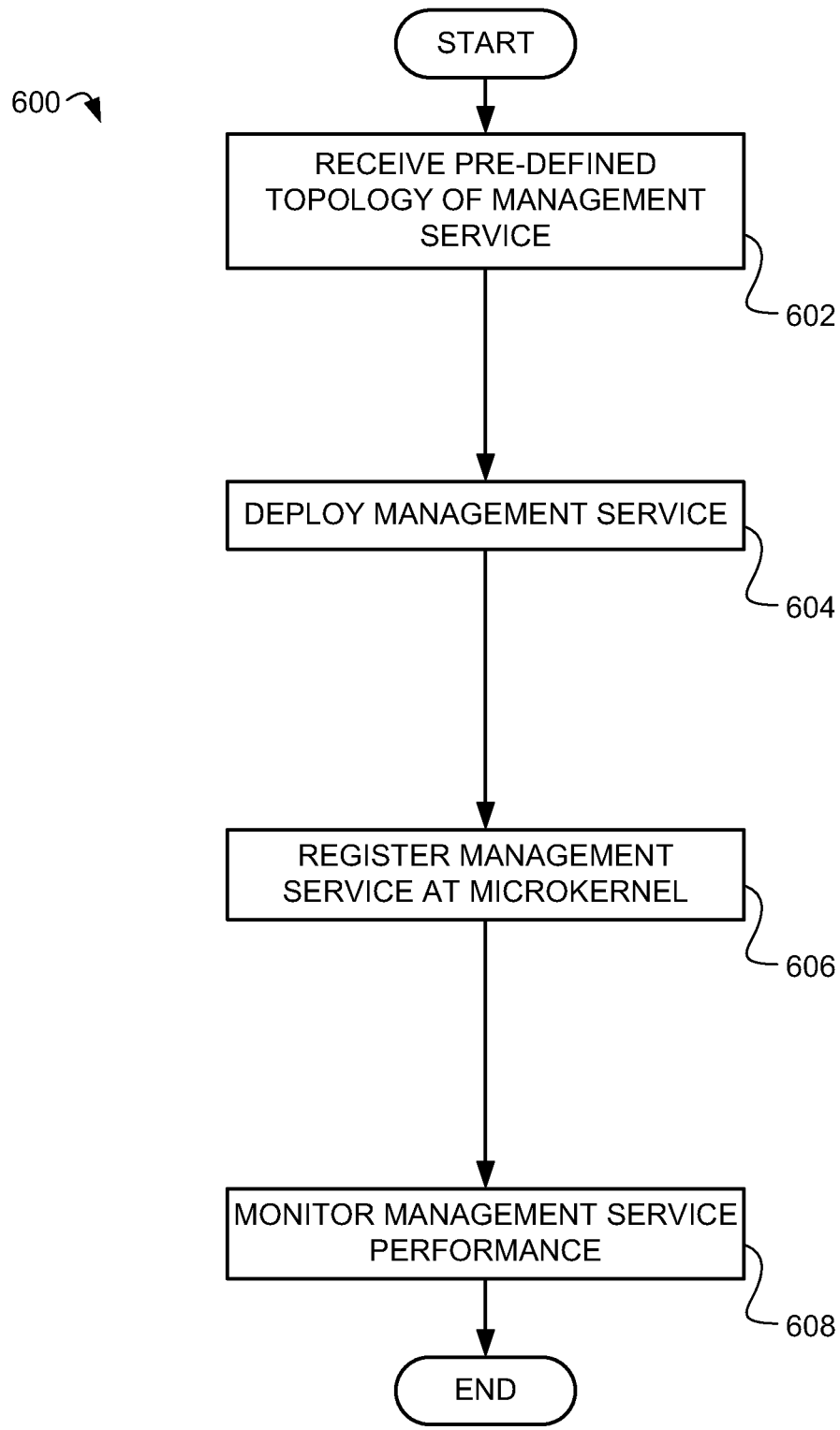
FIG. 6 is a flowchart of a process performed by a service manager to manage a management service.

FIG. 6 is a flowchart of a process 600 performed by the service manager 204 to manage a management service in the control layer 302. While directed to management services, the process 600 is similar to the management of one or more services 170. In an operation 602, a pre-defined topology of a management service (e.g., dispatcher 212, configuration manager 214, provisioning manager 216, resource manager 218, or lock manager 220) is retrieved by the service manager 204 from the topology database 406. In an operation 604, the service manager deploys the management service using the agents installed on the server hosting the management service. In case the management service itself is spread across multiple servers, the service manager communicates with the agents installed on all such servers. The deployed management service is registered at the microkernel in an operation 606. During operation, the management service is monitored by its respective service manager 204. The service manager 204 may redeploy the management service in the event of a failure.

Figure 10:
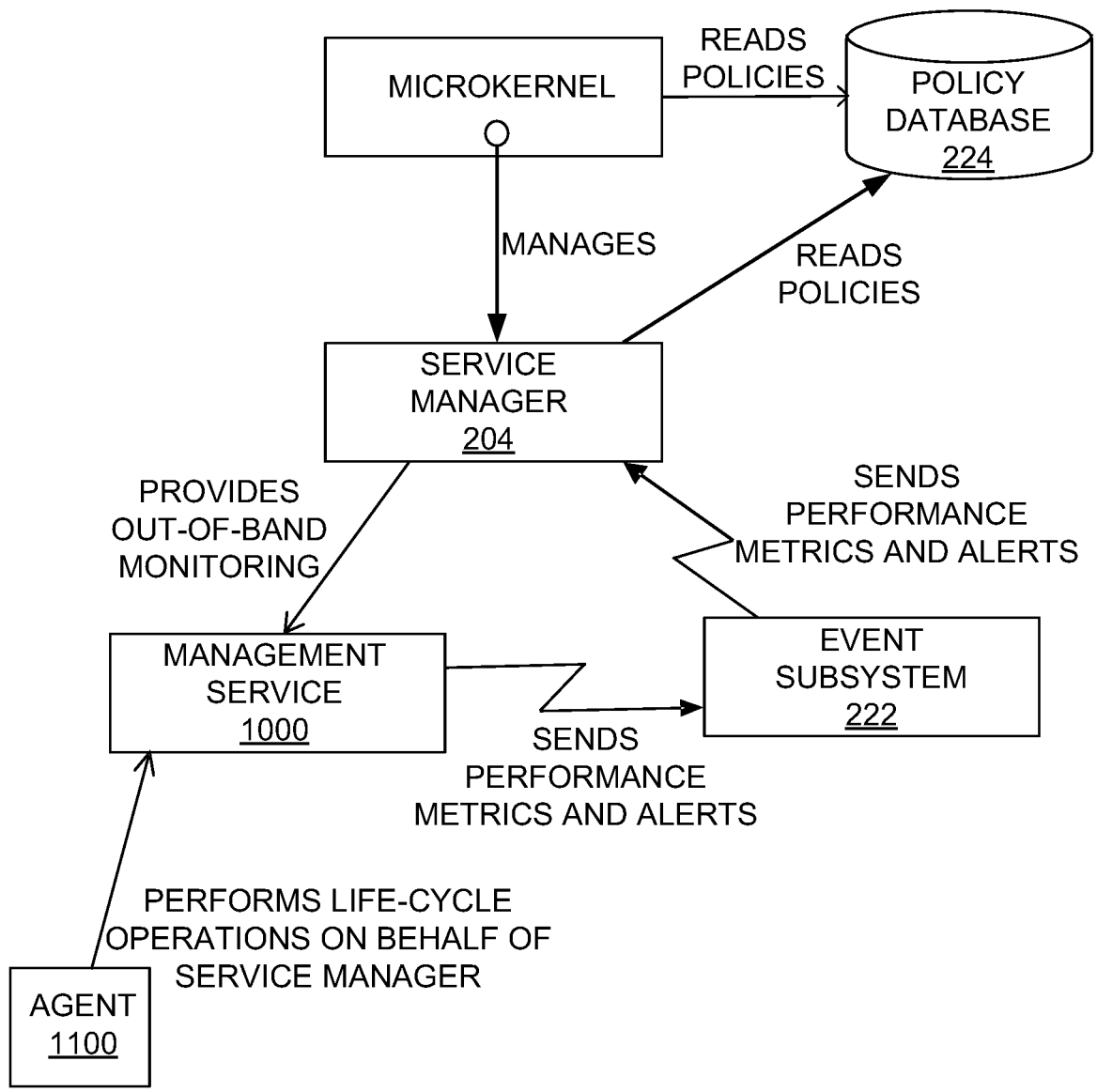
FIG. 10 is a block diagram of the internals of the management system that shows monitoring of internal subsystems according to some embodiments.

As depicted in FIG. 10, each management service 1000 publishes performance metrics and alerts (henceforth called events) through the event subsystem 222. The events may be processed (filtered, aggregated, correlated, etc.) and then consumed by one or more subscribed service managers 204. Each service manager 204 managing a management service 1000 also performs out-of-band monitoring to determine the liveness and responsiveness of its management services. Within the service manager 204, the out-of-band monitoring data is treated as events. Within the service manager 204, the events are dispatched to the respective controllers (e.g., controller 206). Each controller then decides if the events received may adversely affect the service level objectives (SLOs) for the management service 1000. This may happen, for example, when a management service 1000 or one or more of its constituent resources fails. If such a determination is made then the controller takes corrective action(s) by retrieving the relevant policy from the policy database 224 and executing the action(s) specified therein. Examples of corrective actions include restarting the failed management service, or redeploying it. The feedback loop and deciding on a corrective action, if appropriate, is equivalent to those used for managing a deployed service 170.

The internal event subsystem 222 being a management service 1000 itself also publishes its own performance metrics and alerts. In the event it itself fails, its service manager 204 is able to detect this situation since it also independently does out-of-band monitoring as shown in FIG. 10.

Figure 7:
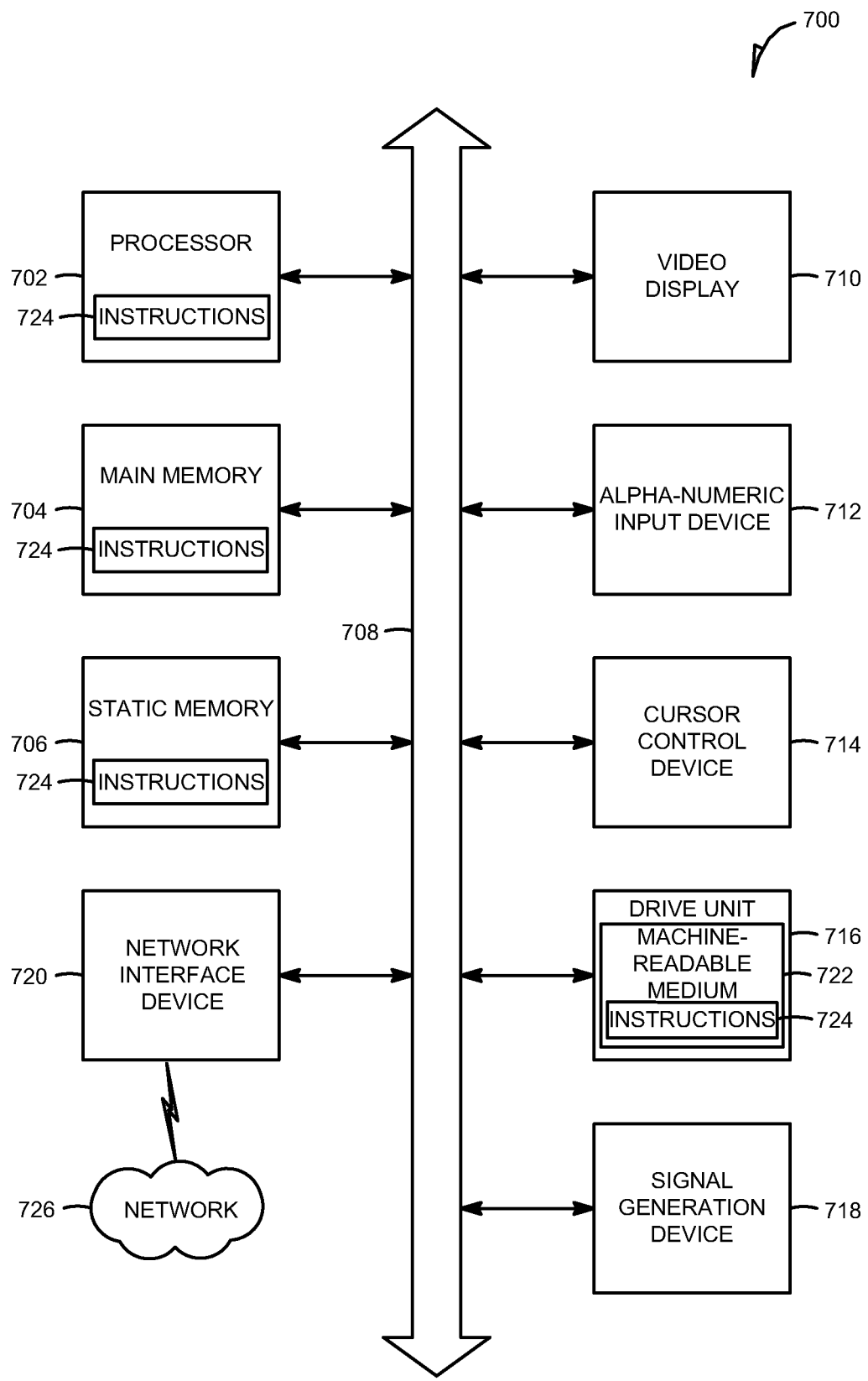
FIG. 7 is a diagrammatic representation of machine within which a set of instructions, for causing the machine to perform any one or more of the methodologies discussed herein, may be executed.

FIG. 7 is a diagrammatic representation of machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to autonomously manage a plurality of domain services in a domain architecture have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Some embodiments described herein may be used to solve one or more technical problems. For example some embodiments may facilitate more efficient resource management and reduce the need to redeploy a system in event of a failure or performance lag or when adding to or modifying an architecture domain.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   at least one memory storage device configured to store one or more instructions which, in response to being executed by the at least one processor, perform operations comprising:
      sending, from a first microkernel controller to a first agent installed on a first remote server, a first message to deploy a first service manager to manage a first service, wherein the first microkernel controller is operable to manage the first service manager;
      sending, from a second microkernel controller to a second agent on a second remote server, a second message to deploy a second service manager to manage a second service, wherein the second microkernel controller is operable to manage the second service manager:
         dynamically creating a topology indicative of a plurality of service managers deployed using a plurality of remote servers, wherein the topology indicates that the first service manager is deployed on the first remote server and that the second service manager is deployed on the second remote server; and
         using the topology to manage performance of the first service manager and the second service manager, including by:
            monitoring, by the first microkernel controller, a performance of the first service manager as it manages the first service: and
            monitoring, by the second microkernel controller, a performance of the second service manager as it manages the second service.

2. The system of claim 1, wherein the first service manager is deployed across multiple servers.

3. The system of claim 1, wherein managing the performance of the first service manager includes:
   receiving performance metrics from the first agent regarding performance of the first service manager.

4. The system of claim 3, wherein the performance metrics are normalized by the first agent to conform to an information model understood by the system storing the first microkernel controller.

5. The system of claim 1, wherein managing the performance of the first service manager includes performing life cycle operations for the first service manager.

6. The system of claim 5, wherein the performing life cycle operations includes:
   sending a third message to the first agent to redeploy the first service manager based on a failure of the first service manager, wherein the failure of the first service manager is determined based at least on the dynamically created topology.

7. The system of claim 1, wherein the first agent is further configured to start and stop the first service managed by the first service manager.

8. One or more non-transitory computer-readable media storing instructions, which in response to being executed by one or more processors, cause a system to perform operations comprising:
   sending, from a first microkernel controller to a first agent installed on a first remote server, a first message to deploy a first service manager to manage a first service, wherein the first microkernel controller is operable to manage the first service manager;
   sending, from a second microkernel controller to a second agent on a second remote server, a second message to deploy a second service manager to manage a second service, wherein the second microkernel controller is operable to manage the second service manager;
   dynamically creating a logical topology indicative of a plurality of service managers deployed using a plurality of remote servers, wherein the logical topology indicates that the first service manager is deployed on the first remote server and that the second service manager is deployed on the second remote server, wherein the logical topology identifies abstract types of resources utilized by the first service manager and the second service manager; and
   using the logical topology to manage performance of the first service manager and the second service manager, including by:

monitoring, by the first microkernel controller, a performance of the first service manager as it manages the first service; and monitoring, by the second microkernel controller, a performance of the second service manager as it manages the second service.

9. The computer-readable media of claim 8, wherein the first service manager is deployed across multiple servers, and wherein the first message is further sent to an associated agent that corresponds with each of the multiple servers.

10. The computer-readable media of claim 8, wherein managing the performance of the first service manager includes:

receiving performance metrics from the first agent regarding performance of the first service manager.

11. The computer-readable media of claim 10, wherein the performance metrics are normalized by the first agent to conform to an information model understood by the system storing the first microkernel controller.

12. The computer-readable media of claim 8, wherein managing the performance of the first service manager includes performing life cycle operations for the first service manager.

13. The computer-readable media of claim 12, wherein the performing life cycle operations includes:

sending a third message to the first agent to redeploy the first service manager based on a failure of the first service manager, wherein the failure of the first service manager is determined based at least on the dynamically created logical topology.

14. The computer-readable media of claim 8, wherein the first agent is further configured to start and stop the first service managed by the first service manager.

15. A method comprising:

sending, from a first microkernel controller to a first agent installed on a first remote server, a first message to deploy a first service manager to manage a first service, wherein the first microkernel controller is operable to manage the first service manager;

sending, from a second microkernel controller to a second agent on a second remote server, a second message to deploy a second service manager to manage a second service, wherein the second microkernel controller is operable to manage the second service manager;

dynamically creating a physical topology indicative of a plurality of service managers deployed using a plurality of remote servers, wherein the physical topology indicates that the first service manager is deployed on the first remote server and that the second service manager is deployed on the second remote server, wherein the physical topology identifies actual instances of resources utilized by the first service manager and the second service manager; and using the dynamically created physical topology to manage performance of the first service manager and the second service manager, including by:

monitoring, by the first microkernel controller, a performance of the first service manager as it manages the first service; and monitoring, by the second microkernel controller, a performance of the second service manager as it manages the second service.

16. The method of claim 15, wherein the first service manager is deployed across multiple servers.

17. The method of claim 15, wherein managing the performance of the first service manager includes:

receiving performance metrics from the first agent regarding performance of the first service manager.

18. The method of claim 17, wherein the received performance metrics are normalized by the first agent to conform to an information model understood by a system storing the first microkernel controller.

19. The method of claim 15, further comprising;

sending a third message to the first agent to redeploy the first service manager based on a failure of the first service manager, wherein the failure of the first service manager determined based at least on the dynamically created physical topology.

20. The method of claim 15, wherein the first agent is further configured to start and stop the first service managed by the first service manager.

* * * * *